Oct. 17, 1944.   J. P. SPANG   2,360,728
MEAT SLITTING MACHINE
Filed Oct. 7, 1941   4 Sheets-Sheet 1
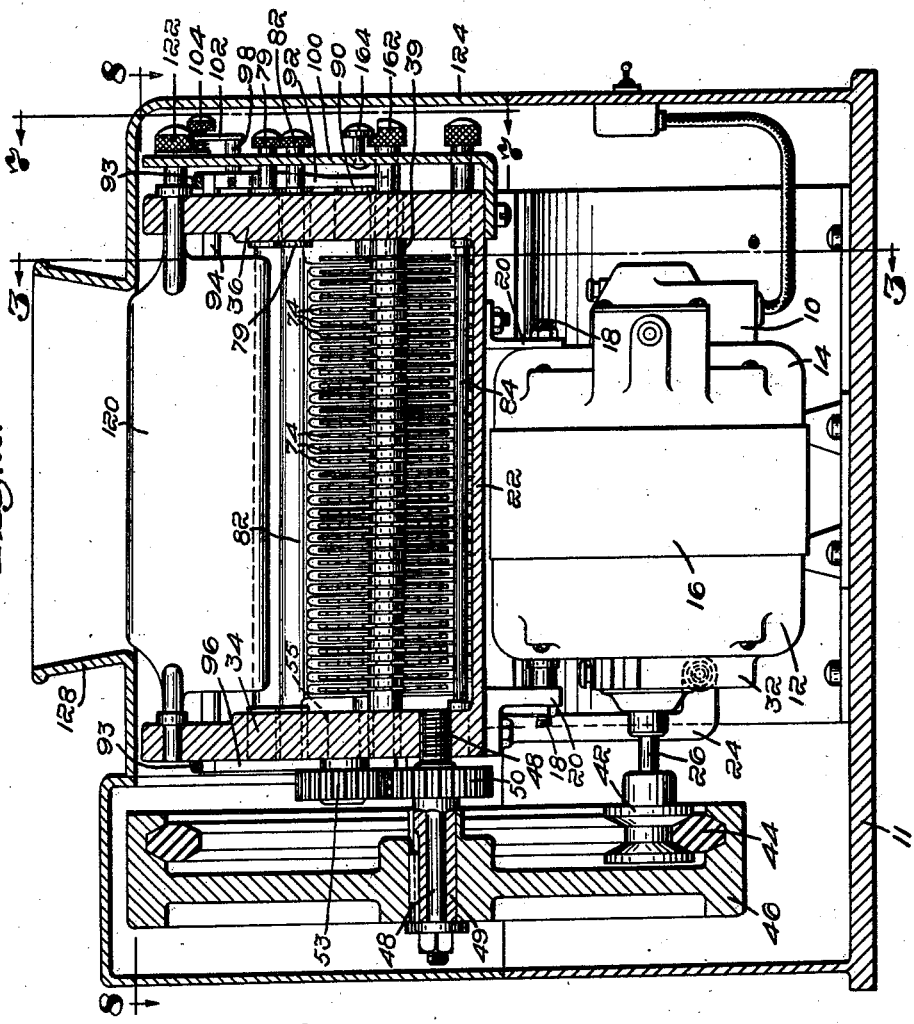

Oct. 17, 1944. J. P. SPANG 2,360,728
MEAT SLITTING MACHINE
Filed Oct. 7, 1941 4 Sheets-Sheet 2

Inventor:
Joseph P. Spang
by Kenway & Witter
Attorneys

Oct. 17, 1944. J. P. SPANG 2,360,728
MEAT SLITTING MACHINE
Filed Oct. 7, 1941 4 Sheets-Sheet 3

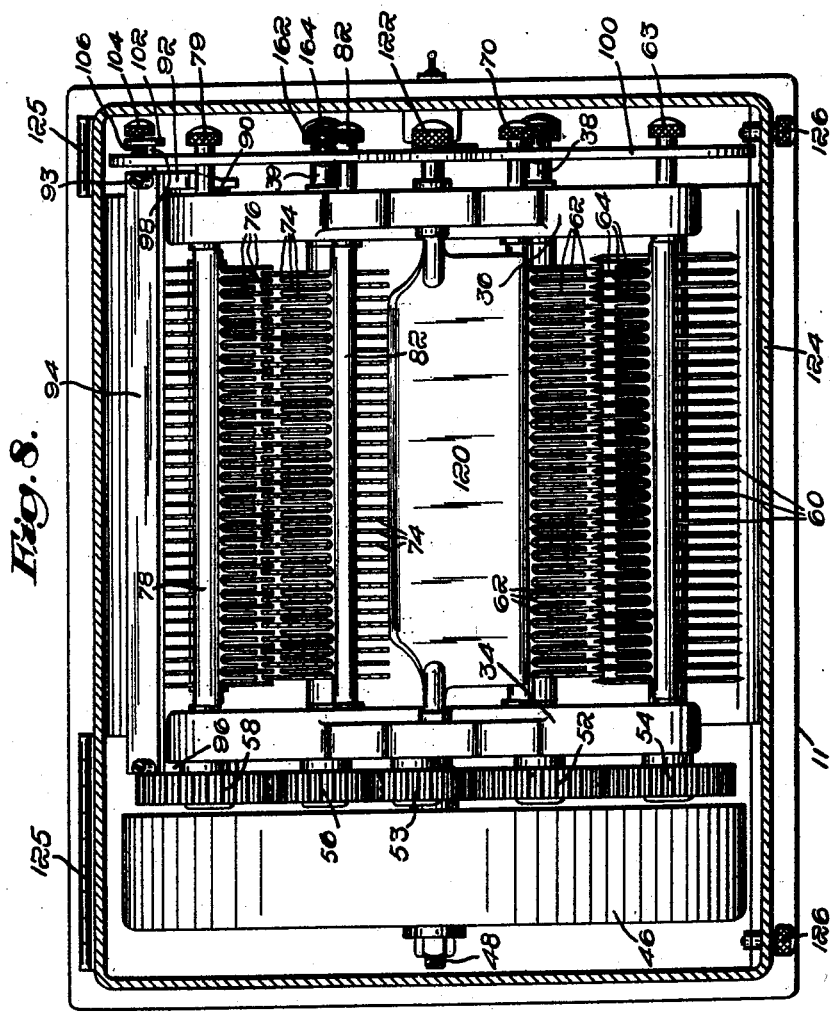

Patented Oct. 17, 1944

2,360,728

UNITED STATES PATENT OFFICE 2,360,728

MEAT SLITTING MACHINE

Joseph P. Spang, Quincy, Mass., assignor to Cube Steak Machine Co., Boston, Mass., a corporation of Massachusetts Application October 7, 1941, Serial No. 413,944

7 Claims. (Cl. 17—26)

This invention relates to meat treating machines of the general type in which a strip of meat is fed between adjacent gangs of revolving knives. One aspect of the invention particularly concerns a duplex machine providing two types of cutting or slitting gangs of cutters, depending upon the requirements of the meat to be treated, and an object of the invention resides in the production of such a duplex machine having combined therewith novel mechanism for optionally directing the meat to one or the other gangs of cutters employed in the machine.

A further feature of the invention relates more particularly to novel and improved gangs of cutters embodying meat tendering and knifing disks scalloped at their peripheries to provide outwardly disposed and relatively spaced blades adapted to knife the meat thereby severing a portion of the fibres and tucking in some of the fibres and compressing the meat in a manner forming it into the most desirable compact unit pieces, the disks preferably being arranged with the adjacent and cooperating blades in staggered relation in which they perform the desired function with increased facility.

The machine furthermore embodies cooperating gangs of meat treating disks in spaced relation on and along parallel shafts adapted to receive and treat meat passed therebetween, and an object of the invention resides in such meat treating mechanism having combined therewith novel comb-like strippers having fingers disposed between the disks and so mounted and controlled adjustably and resiliently that the treating action of the cutters on the meat can be most efficiently effected.

Figure 3:
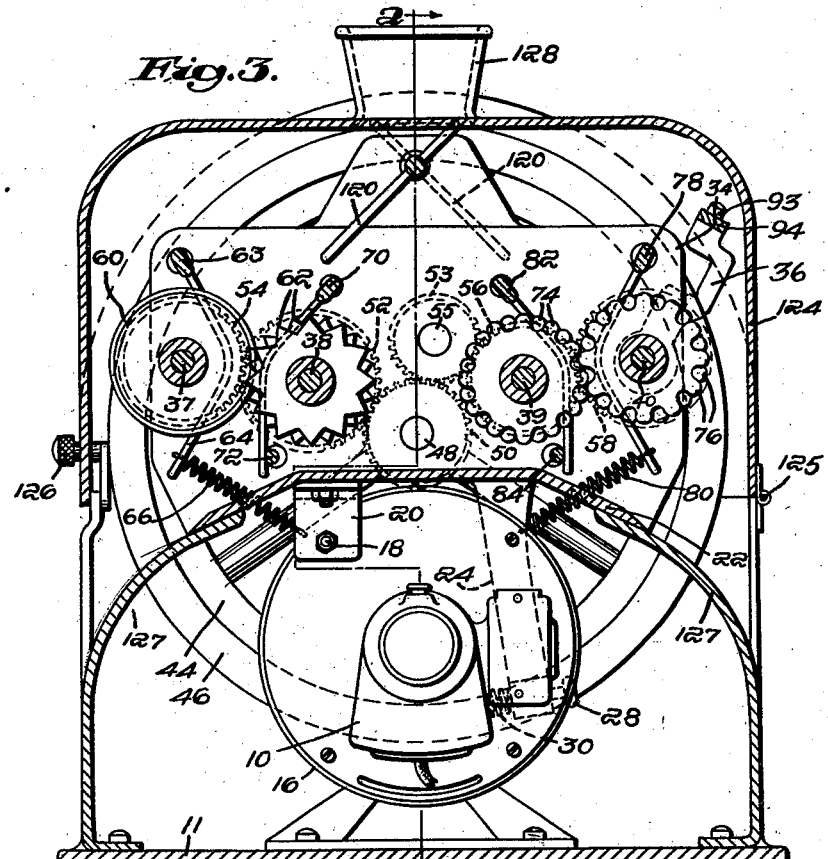
Figure 4:
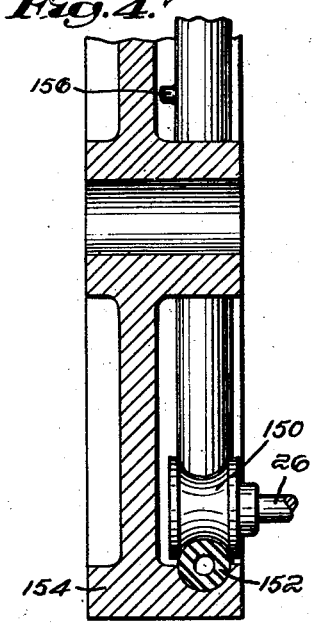
Figure 5:
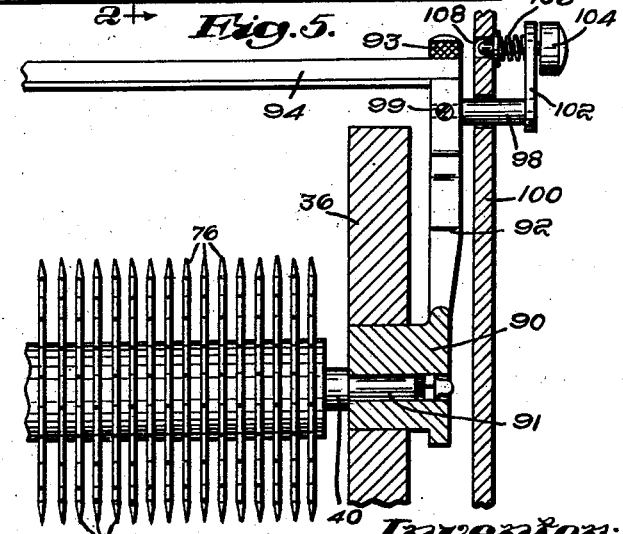
Figure 6:
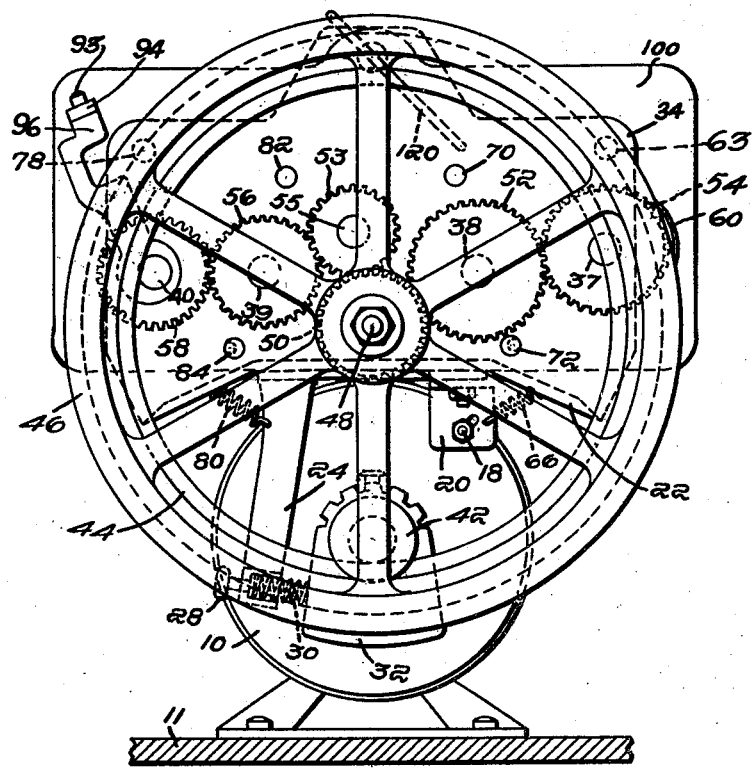
Figure 7:
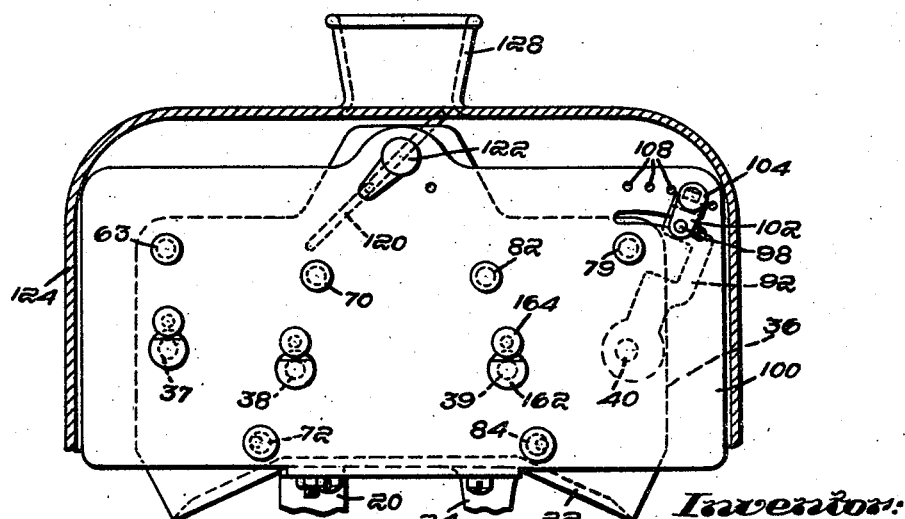

These and other objects and features of my invention will be more readily understood and appreciated from the following detailed description of a preferred embodiment thereof selected for purposes of illustration and shown in the accompanying drawings, in which:

Fig. 1 is a view in side elevation showing one form of slitting knives and feed roller constructed according to my invention, Fig. 1a is a view in end elevation of the structure shown in Fig. 1, Fig. 2 is a view in cross section along the line 2—2 of Fig. 3, Fig. 3 is a view in cross section along the line 3—3 of Fig. 2, Fig. 4 is a view in cross section through a modified form of drive mechanism, Fig. 5 is a view in cross section on an enlarged scale showing details of the eccentric bearings for one of the knife shafts, Fig. 6 is a view of the machine in end elevation with the casing removed, Fig. 7 is a view in cross section along the line 7—7 of Fig. 2, and Fig. 8 is a plan view in cross section along the line 8—8 of Fig. 2.

Although the invention includes a double slitting machine with two separate sets of slitting knives, certain features of the invention are obviously equally applicable to a single machine. In its general organization the machine comprises a frame 22 pivotally mounted above a motor 10 which drives shafts carrying disk slitting knives mounted within the frame 22. Meat or similar material is adapted to be fed between adjacent rows of knives, the knives slitting the meat according to a predetermined pattern.

As shown in the drawings, a motor 10, bolted to a base plate 11 and having the conventional combination of a central frame 16 and end plates 12 and 14, carries in its upper portion an elongated bolt 18 extending through and beyond the motor 10 and serving as a pivotal mounting for two lugs 20. The lugs 20 are bolted securely to the bottom of a U-shaped frame 22 having upright end walls 34 and 36 (Fig. 2) which provide bearings for various shafts as will hereinafter be described.

An arm 24 integral with the frame 22 extends downwardly therefrom and terminates in an enlarged head bored to receive a compression spring 30 which bears against the motor shaft bearing 32; an adjusting thumb screw 28 threaded in the head of the arm 24 bears against the end of the spring 30. It will be evident that the arm 24 can be moved to rock the frame 22 about the axis of the bolt 18 and that the screw 28 provides means for adjusting the relative positions of the motor 10 and the frame 22. Threaded in the wall 34 of the frame 22 is a stub shaft 48 rotatably carrying thereon a fly wheel or drive wheel 46 having a V-shaped groove provided in its inner rim for the reception of a double friction ring 44. The motor 10 includes a shaft 26 which carries a pulley or sheave 42 at its outer end, the pulley being grooved to fit the contour of the ring 44. It will be apparent that the motor drives the fly wheel through the medium of the friction ring; the screw 28 may be turned to lift the frame 22 and the fly wheel 46 to force the ring 44 against the sheave 42 when the ring wears. Rotatable on the fly wheel shaft 48 and splined to the fly wheel 46 is a sleeve 49 integral with a pinion 50 which is in mesh with a gear 52 carried on a shaft 38 journalled in the walls 34 and 36 of the frame 22. The gear 52 meshes with a gear 54 of similar size carried on a shaft 37 also journalled in the walls 34 and 36. The pinion 50 also meshes with a gear 53 which is carried on a short stub shaft 55 journalled in the wall 34. The latter gear meshes with a gear 56 carried on a shaft 39 and the gear 56 is in mesh with a gear 58 carried on a shaft 40, both the shafts 39 and 40 being mounted in bearings in the walls 34 and 36 and the gears 56 and 58 being of equal diameters.

Locked in place on the shaft 37 is a series of identical disk blades 60 and the shaft 38 carries a series of feed disks 62 provided on their circumferences with sharp points disposed in staggered relation, and the blades 60 and the feed disks 62 are relatively spaced along the shafts 37 and 38 in such staggered relation that the blades 60 pass into the spaces between adjacent feed disks 62. Mounted above the shaft 37 is a stripper comprising an elongated bar 63 and comb-like stripper fingers 64, the fingers fitting into the spaces between adjacent blades 60 on the shaft 37. A spring 66 is secured to one of the lugs 20 and to the end finger 64, the end finger being relatively stiff. The spring 66 urges the stripper fingers 64 away from the shaft 37. A similar stripper 70 is mounted above the shaft 38, the stripper fingers extending down between adjacent feed disks 62. An eccentric shaft 72 journalled in the walls 34 and 36 is disposed in contact with the ends of the stripper fingers of the stripper 70, and it will be seen that the fingers of the stripper 70 are moved toward and from the shaft 38 when the eccentric shaft 72 is turned.

Secured at spaced intervals to the shaft 39 is a series of disks scalloped at their peripheries to form outwardly disposed knives 74 having rounded sharpened edges at their outer ends, and a similar set of disk knives 76 is secured to the shaft 40. The knives 74 and 76 are relatively staggered along their respective shafts so that the knives on each disk occupy positions disposed opposite to the gaps between the adjacent knives on the disks on opposite sides thereof. Furthermore the arrangement of each of the sets of knives 74 and 76 is such that the teeth of each set are in staggered relation where their peripheral portions overlap. Above the shaft 40 is a stripper 78 precisely similar to the stripper 63 and urged from the shaft 40 by a tension spring 80 connected to its free end. One end of the stripper 78 is received in a removable sleeve 79 which can be pulled out to permit withdrawal of the stripper. A stripper 82 is mounted above the shaft 39 and the position of its fingers is controlled by means of an eccentric shaft 84 engaging its free end similar to the shaft 72.

The mounting for the shaft 40 is adjustable and the construction thereof is clearly visible in Fig. 5. A cylindrical bearing 90 is rotatably mounted in the wall 36 of the frame 22 and into this bearing extends the reduced end 91 of the shaft 40, the bore in the bearing 90 which receives the end 91 being offset from the center so that when the bearing 90 is rotated, the shaft 40 is bodily moved. An arm 92 secured to the bearing 90 carries at its outer end a long bar 94 which extends across the frame 22 and is secured to a corresponding arm 96 affixed to a bearing (not shown) carried in the wall 34 and similar to the bearing 90. The opposite end of the shaft 40 is also reduced and fits eccentrically into the bearing just referred to as contained in the wall 34. It will be apparent that when the arm 92 is moved to rotate the bearing 90, the opposite bearing in the wall 34 is also rotated and the entire shaft 40 is moved bodily. The adjustable mounting of the shaft 40 is provided to vary the distance between the shafts 39 and 40 and thus to regulate the extent to which the knives 74 and 76 enter a slice of meat fed between them. Only slight movement of the shaft 40, not sufficient to disengage the gears on the shafts 39 and 40, is required for the purpose of regulating the depth of cut. A rod 98, secured to the arm 92 by means of a screw 99 extends through a slot in a partition or end plate 100 spaced from the wall 36 and carries at its outer end a link 102. Near the end of the link 102 a pin 104 is slidably mounted and urged toward the partition 100 by a spring 106 which is disposed about its shank. The partition 100 is pierced by a series of holes 108 which receive the pin 104 and serve to maintain the adjustment of the arm 92 in a number of fixed selected adjusting positions.

The bar 94 is secured to the arms 92 and 96 by screws 93. To remove the shaft 40 from the machine, the screw 99 and wall 100 are removed (Figs. 2 and 5). The shaft 40 with its assembly of knives can then be moved longitudinally in a direction withdrawing its opposite end from the bearing sleeve supporting the gear 58. The shaft 40 can then be moved in the opposite direction to free its reduced end 91 from the bearing 90.

Journalled in the upper central portions of the walls 34 and 36 is a feed plate 120 located directly beneath a slot in a cover over the slitting mechanism. The feed plate 120 can be swung into either of two positions by means of a knob 122 extending through the wall 100 so that a piece of meat passing through the slot and sliding down the plate 120 will be directed between the strippers 78 and 82 or between the strippers 63 and 70, according to the position of the feed plate 120, and the type of cut desired can be selected by adjusting the feed plate 120. A casing 124 preferably encloses the entire machine and is hinged as shown at 125. Thumb screws 126 are provided for securing the casing in closed position. The casing opens below the knives and is curved inwardly as shown at 127 to provide a delivery chute for slit meat and a hopper 128 having a meat passage or slot therethrough is provided in the top of the casing and located above the adjustable feed plate 120.

If the meat to be slitted is directed between the strippers 63 and 70, the blades 60 will provide a row of deep parallel slits extending entirely across one surface of the meat and the opposite side will be punctured at intervals by the points on the feed disks 62, and since the meat is impaled on the points of the disks 62 the blades 60 will cut cleanly. If a smooth feed roller was substituted for the disks 62 the knives 60 would accelerate the rate of feed of the meat and the cuts would be tears rather than clean slits.

In some cases the meat which has been put through between the strippers 63 and 70 will be reversed and put through again with the result that the surface which has been slit comes against the points of the feed disks 62 and the surface of the meat which has previously been punctured by the points of the feed disks 62 will be slit by the blades 60. However, the blades 60 are apt to encounter punctures previously made by the points of the disks 62 and this meeting is apt to result in tearing instead of clean slitting. To overcome this difficulty I may substitute for the disks 62 a unitary feed roll 134 of the type shown in Figs. 1 and 1a. In this construction a series of circular blades 130 carried on a shaft 132 is placed adjacent a hollow, open-ended feed roll 134 carried on a shaft 136; spokes 135 connect the shell to the shaft. The surface shell of the feed roll 134 is provided with numbers of through and through perforations 138. When meat is fed between the blades 130 and the roll 134, that surface of the meat which comes in contact with the roll 134 is pressed into the perforations 138, and the bulging of the meat into the perforations 138 prevents relative movement of the meat and the roll 134 and also prevents the blades 130 from accelerating the rate of feed of the meat, with the result that the slits are clean. The roll 134 can easily be cleaned since it can be flushed out by a stream of water directed through its open ends. Most important, however, is the fact that the meat is not punctured as the result of its contact with the roll 134 so that when the meat is reversed for a second slitting operation the surface which is presented to the blades 130 is free from punctures or other interruptions. This perforated roll is more fully described and claimed in my copending application, 453,767 filed August 6, 1942.

It is well known that whole pieces of steak and like meats are more desirable and of greater commercial value than is meat which is broken up into small and stringy pieces, and the knifing disks 74 and 76 are adapted to serve the additional and important function of bonding such broken pieces of meat into compact and steak-like units. When such meat is treated it is formed into unit masses and passed a plurality of times through the machine. At each passage the knives serve the additional function of tucking previously severed fibres and loose ends into the meat which has been tenderized by previous passages through the machine, the disks also serving to compress the mass units of meat more compactly at each passage through the machine. It is also frequently desired to form composite meat units embodying more than one kind of meat as for example a beef and pork combination, and my improved machine is particularly adapted to serve this function. In such case the meat units are formed of the desired meat, in both kind and proportion, and repeated passage of the units through the machine both tenderizes and molds them into unit steaks or like servings. It will also be apparent that the staggered relation of the blades 74 and 76 on the two shafts and the staggered relation of the blades on each shaft serve more effectively to perform the tenderizing and knitting functions and it will be understood that any staggered relation most suitable and effective can be employed, that illustrated in the drawings being shown by way of example only.

It is further explained that the disk knives 74 and 76 tenderize the meat by closely disposed discontinuous knife cuts therethrough and not by any mangling, tearing or crushing of the meat. It is well known that the food value and flavor of meat are largely contained within the meat juices enclosed within tiny cells. Crushing or mangling of the meat destroys these cells and permits the juices to escape, and in the cooking process the heat absorbs these juices so that their value is largely lost and the meat becomes dry and unpalatable. Tenderizing the meat by knife cuts leaves most of the cells intact and when the heat is applied the cells are seared over with the juices retained therein. The difference is well illustrated by a cooked steak and cooked hamburger, the former being juicy and flavorful and the latter being dry and lacking in flavor.

This knifing of the meat without tearing, as above described, requires that the blades on each disk shall be spaced a substantial distance apart with gaps therebetween diverging outwardly whereby to sever the meat with independent knife thrusts and that the two sets of knifing disks 74 and 76 shall be driven at substantially equal peripheral speeds causing the blades to enter and withdraw from the meat in a manner effecting the knife cuts without tearing the meat. The knifing disks 74 and 76 are driven at such speeds by the gears 56 and 58 of equal diameters on the shafts 39 and 40. It will also be apparent that the staggered relation of the blades on the two shafts provides for a more equal distribution of the knife thrusts along and through the meat areas treated.

In Fig. 4 I have shown a modified form of friction ring for driving the slitting machine. The motor shaft 26 carries at its outer end a pulley 150 having an arcuate groove which receives a hollow circular ring 152 carried in a semi-circular groove in a fly wheel 154. A valve 156 provides means for inflating the ring 152. When the ring 152 becomes worn in use so that it slips along the pulley 150, the ring may be inflated, thus causing it to expand and entirely fill the space defined by the groove in the inner rim of the fly wheel 154 and the arcuate groove in the pulley 150. When the ring is first installed in the machine it may contain air or other fluid under atmospheric pressure and additional pressure can be applied through the valve 156 from time to time in the course of the life of the machine.

The shafts 37, 38 and 39 are removable so that they may more easily be cleaned. To accomplish this result the wall 36 is apertured to receive sleeves having knurled outer ends. The end of the shaft 39 is shown as received in the sleeve 162 which has its knurled end shouldered to fit beneath the enlarged head of a pin 164. This pin 164 can be removably secured in any convenient manner as, for example, by being screw-threaded into the plate 100. The end of the shaft 39 is then free of its bearing and the shaft can be lifted out. The other shafts 37 and 38 have similar removable bearings but the shaft 40 is removed from its eccentric bearing 90 in the special manner hitherto described.

Having thus described my invention what I claim as new and desire to secure by Letters Patent of the United States is:

1. A meat slitting machine comprising two pairs of adjacently disposed gangs of knives, means for rotating the knives, a cover having a slot disposed over the knives, a swinging plate disposed beneath the slot, and means for swinging the plate to direct meat fed through the slot between one or the other pairs of gangs of knives.

2. A meat slitting machine comprising two pairs of shafts, each pair being mounted in adjacent parallel relation, slitting means secured to each pair of shafts, a cover having a slot disposed above the two pairs of shafts, a meat guiding member disposed beneath the slot, and means for moving the member to two positions respectively adapted to direct meat fed through the slot to the two pairs of shafts.

3. A meat slitting machine comprising a frame, four shafts journalled in the frame and arranged as pairs in adjacent parallel relation, feeding and slitting means carried by each pair of shafts, a motor, means including gearing connecting the motor with all of the shafts, a cover over said means having a slot disposed midway between the two pairs of shafts, and a feed plate mounted below the slot and capable of being swung toward either pair of shafts to positions directing meat from the slot thereto.

4. A meat slitting machine comprising a frame, two pairs of shafts journalled in the frame, meat slitting means of different character secured to the pairs of shafts, and means adjustable to positions for directing meat between either pair of shafts, whereby the character of the slitting to be done can be pre-selected.

5. A machine for slitting meat which comprises a covered frame, slitting mechanisms of different character disposed within the covered frame, a slot in the cover, and means adjacent the slot for directing meat from the slot optionally to any one of the slitting mechanisms.

6. A meat treating machine, comprising a pair of relatively adjacent and parallel shafts mounted in horizontally spaced relation, meat treating disks in spaced relation on and along the shafts with the disks on each shaft disposed alternately with the disks on the other shaft and extending inwardly of the peripheral outline of the disks on the other shaft, the disks having cutting edges on their peripheries, two comb-like strippers pivoted respectively above the shafts and having stripper fingers extending downwardly between the disks and spaced from and disposed between the shafts, means engaging the free end of one of the strippers and resiliently and pivotally urging it toward the other stripper, and means engaging the free end of the other stripper for pivotally adjusting it toward the said one stripper.

7. A meat treating machine, comprising a pair of relatively adjacent and parallel shafts, meat knifing disks in spaced relation on and along the shafts with the disks on each shaft disposed alternately with the disks on the other shaft and extending inwardly of the peripheral outline of the disks on the other shaft, each disk having a scalloped periphery providing knife-like cutting blades extending outwardly therearound in the plane of the disk and spaced a substantial distance apart with gaps therebetween diverging outwardly, the cutting blades having sharpened cutting edges at the circumferences of the disks adapted to make discontinuous cuts in meat passed between the shafts, and the adjacent blades within the meeting peripheral outlines of the disks being in staggered relation and being the sole meat engaging elements on the shafts within the said meeting peripheral outlines of the disks, and means connecting the shafts for rotation in opposite directions and at speeds rotating the disks at substantially equal peripheral speeds.

JOSEPH P. SPANG.